(12) United States Patent
Balakrishnan et al.

(10) Patent No.: US 10,637,871 B2
(45) Date of Patent: Apr. 28, 2020

(54) LOCATION-BASED AUTHENTICATION

(71) Applicant: Oracle International Corporation, Redwood Shores, CA (US)

(72) Inventors: Aarathi Balakrishnan, Bangalore (IN); Vipin Koottayi, Trikarpur (IN); Vikas Pooven Chathoth, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 247 days.

(21) Appl. No.: 15/659,530

(22) Filed: Jul. 25, 2017

(65) Prior Publication Data
US 2019/0036940 A1    Jan. 31, 2019

(51) Int. Cl.
| | |
|---|---|
| H04L 29/06 | (2006.01) |
| H04W 12/06 | (2009.01) |
| G06Q 20/32 | (2012.01) |
| H04L 29/12 | (2006.01) |
| G06Q 20/40 | (2012.01) |
| H04W 12/00 | (2009.01) |

(52) U.S. Cl.
CPC ....... *H04L 63/107* (2013.01); *G06Q 20/3224* (2013.01); *G06Q 20/40145* (2013.01); *H04L 61/2007* (2013.01); *H04L 63/08* (2013.01); *H04L 63/083* (2013.01); *H04L 63/12* (2013.01); *H04L 63/1416* (2013.01); *H04W 12/00502* (2019.01); *H04W 12/00503* (2019.01); *H04W 12/06* (2013.01)

(58) Field of Classification Search
CPC ..... H04L 63/083; H04L 63/107; H04L 63/12; H04L 63/1416; H04L 61/2007; H04W 12/06; G06Q 20/3224
See application file for complete search history.

(56) References Cited

U.S. PATENT DOCUMENTS

| 8,844,005 B2 | 9/2014 | Jakobsson et al. |
|---|---|---|
| 8,955,058 B2 | 2/2015 | Castro et al. |
| (Continued) | | |

OTHER PUBLICATIONS

"OneLogin Mobile OTP App", retrieved from the internet: https://www.onelogin.com/product/strong-authentication/onelogin-otp, ©, 2016, 4 pages.

*Primary Examiner* — Jeffrey C Pwu
*Assistant Examiner* — Thong P Truong
(74) *Attorney, Agent, or Firm* — Kilpatrick Townsend & Stockton LLP

(57) ABSTRACT

Location-based authentication may be provided by an access management system on a server. The location-based authentication may determine whether a device should be granted access to a resource. The resource may either be located on or remote from the server. The location-based authentication may provide an additional authentication factor that is based on a past location of a user and/or device associated with the user requesting authentication. The past location may be associated with a user-configured question. The user-configured question may be provided to the device for an additional level of security. An answer received in response to a user-configured question may be compared to a user-configured answer that is associated with the user-configured question. In other examples, the answer may be compared to one or more possible answers that are determined by the access management system.

20 Claims, 12 Drawing Sheets

(56) References Cited

U.S. PATENT DOCUMENTS

| | | | |
|---|---|---|---|
| 8,990,909 B2 | 3/2015 | Kelley | |
| 9,014,666 B2 | 4/2015 | Bentley et al. | |
| 9,043,887 B2 | 5/2015 | McLachlan et al. | |
| 9,088,560 B1 | 7/2015 | Newstadt et al. | |
| 9,106,422 B2 | 8/2015 | Varghese et al. | |
| 9,177,125 B2 | 11/2015 | Steeves et al. | |
| 9,223,950 B2 | 12/2015 | Li et al. | |
| 9,292,670 B2 | 3/2016 | Gupta et al. | |
| 2009/0063850 A1 | 3/2009 | Joram et al. | |
| 2009/0089876 A1* | 4/2009 | Finamore | G06F 21/40 726/21 |
| 2013/0254036 A1 | 9/2013 | Trinh et al. | |
| 2015/0132984 A1 | 5/2015 | Kim et al. | |
| 2016/0112397 A1* | 4/2016 | Mankovskii | H04L 63/105 726/6 |
| 2017/0053280 A1* | 2/2017 | Lishok | G06Q 20/4014 |

\* cited by examiner

USER-QUESTIONS INFORMATION (PER USER) 300

| Location 310 | User-Configured Question 320 | User-Configured Answer 330 |
|---|---|---|
| Dallas, TX | What is your favorite color? | Red |
| Palo Alto, CA | What is your favorite restaurant in your last location? | Evvia |
| San Francisco, CA | What is your favorite restaurant? | In n' Out |
| Tulsa, OK | What is your favorite grocery store in Tulsa? | Safeway |

FIG. 3

USER-QUESTIONS INFORMATION (PER USER) 500

| Location 510 | Question 520 | Answer 530 | Location Shift 540 |
|---|---|---|---|
| Dallas, TX | What is your favorite color? | Red | 10 Miles North |
| Palo Alto, CA | What is your favorite restaurant? | Evvia | 3 Miles East |
| San Francisco, CA | What is your favorite restaurant? | In n' Out | 30 Miles Southwest |
| Tulsa, OK | What is your favorite grocery store? | Safeway | 50 Miles South |

FIG. 5

LOCATION-BASED AUTHENTICATION

BACKGROUND

Access management systems use various techniques including various authentication mechanisms to secure access to resources. The security provided by an access management system may be further increased by using multi-factor authentication mechanisms. For example, on mobile devices, one time passwords (OTP) are commonly used for second factor authentication. As part of the authentication process, an OTP value is sent to a user's device whenever the user tries to access a protected resource. The user is then asked to provide the OTP value to complete the authentication. The success and security associated with using an OTP for authentication is however based on the assumption that the true user is in possession of the user's device to which the OTP is sent. This assumption is however compromised when the particular device is lost or falls into the hands of an "attacker." For example, the attacker may use the OTP to gain access to the protected resource. The attacker may even use the OTP to reset the true user's password, and thus compromise various secure flows. One way to protect against this is to use challenge questions. The problem with challenge questions is that they are typically quite generic, and thus their answers may be easily guessed. If the challenge questions are too complicated, their answers are easily forgotten.

SUMMARY

The present disclosure describes techniques for performing location-based authentication for a user. In certain embodiments, an access management system controlling access to a resource is configured to determine and store a geographical location of a user whenever an access request for access to a resource is received by the access management system from the user. Over time, if access requests are received from the user from different locations, information regarding those geographical locations is stored by the access management system. Whenever a new access request is received from the user, information about the user's past stored geographical locations may be used by the access management system to authenticate the user. Various inventive embodiments are described herein, including methods, systems, non-transitory computer-readable storage media storing programs, code, or instructions executable by one or more processors, and the like.

In certain embodiments, the user may configure one or more questions and corresponding answers for specific locations. Whenever a new access request is received by the access management system from the user, a particular past location of the user is determined from the multiple locations stored by the access management system for the user. A user-configured question specified by the user for that particular past location is then determined and sent to the user. A response is received from the user including an answer to the user-configured question. A check is then made by the access management system to see if the answer received from the user in the response to the question matches the user-configured answer for that particular question for that particular past location. If the two answers match, then the location-based authentication is considered to be successful and the user is allowed to access the resource identified in the new access request. If the two answers do not match, then the location-based authentication is considered to have failed and the user is not allowed to access the resource identified in the new access request.

Provided are methods, systems, and computer-program products for providing location-based authentication. For example, a method may include receiving an access request for a resource. The resource may be an account, a database, a server, data, a device, an application, or the like. In some examples, the access request may be from a client device. In such examples, the access request may include coordinates from a global positioning system. The method may further include determining a current location of the client device based on the access request and determining to perform authentication based on the access request. The method may further include determining a previous location of the client device in response to determining to perform the authentication. In some examples, determining the previous location may include identifying a time shift for the client device. In such examples, the time shift may indicate a number of locations in the past. In some examples, the previous location may be determined based on the time shift. In some examples, the time shift may be user configured. The method may further include determining a user-configured question associated with the previous location and sending the user-configured question to the client device.

In some examples, the method may further include performing a first authentication for the client device based on the access request. In such examples, the authentication may be a second authentication. In some examples, the access request may include one or more authentication credentials. In such examples, the first authentication may use the one or more authentication credentials.

In some examples, the method may further include receiving an answer from the client device in response to the user-configured question and, in response to determining the answer is correct for the user-configured question, granting the client device access to the resource. In some examples, determining the answer is correct may include identifying a user-configured answer for the user-configured question and comparing the user-configured answer to the answer. In other examples, determining the answer is correct may include determining one or more possible answers to the user-configured question and comparing the one or more possible answers to the answer. In such examples, determining the answer is correct may further determining whether the answer is allowed based on one or more user-configured answer rules include in response to matching a possible answer of the one or more possible answers to the answer. In some examples, the access request may be associated with an account. In such examples, the user-configured question may be associated with the account while the one or more possible answers are not associated with the account.

In some examples, the method may further include sendinf a request to the client device for an additional user-configured question in response to determining the answer is correct for the user-configured question. In such examples, the additional user-configured question may be for the current location. In some examples, the request may also be for a user-configured answer corresponding to the additional user-configured question.

In some examples, the method may further include determining a location shift for the client device, wherein the location shift indicates a distance to change the previous location, wherein the user-configured question is associated with the previous location after being changed based on the location shift.

In some examples, the authentication may be performed by an authentication server. In such examples, the resource may be remote from the authentication server. In some examples, the access request may be associated with an account. In such examples, the previous location may be a location in which a user-configured question was provided for the account.

In some examples, the access request may be received by an access management system. In such examples, the access request may be automatically sent to the access management system from a user interface of the client device in response to a user indicating a desire to interact with the resource. For example, the user may start a process for logging into the resource. In some examples, the user, who is interacting with the user interface, may be unaware of a location of the access management system. In such examples, the user may assume that a request is sent directly to the resource, rather than to the access management system.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed may be resorted to by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative examples are described in detail below with reference to the following figures:

FIG. 3 illustrates an example of user-questions information that may be stored by an access management system in certain embodiments;

FIG. 5 illustrates another example of user-questions information for a user;

DETAILED DESCRIPTION

Figure 1:
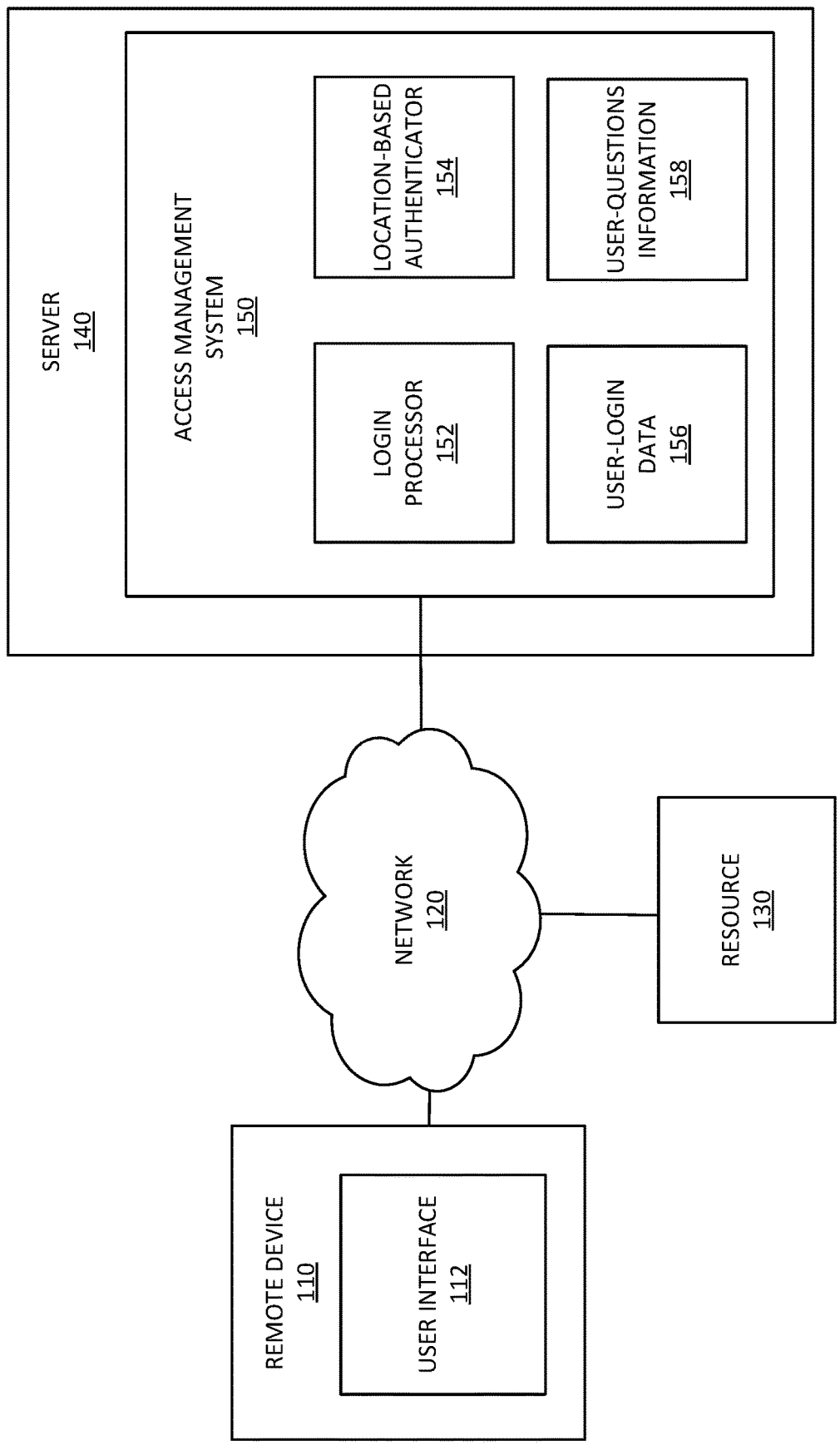
FIG. 1 illustrates an example of a computing environment that may incorporate an access management system on a server.

In the following description, for the purposes of explanation, specific details are set forth in order to provide a thorough understanding of examples of the disclosure. However, it will be apparent that various examples may be practiced without these specific details. The figures and description are not intended to be restrictive.

The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some examples, the systems may be configured as a distributed system where one or more components of the system are distributed across one or more networks in a cloud computing system.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The present disclosure describes techniques for performing location authentication for a user. In certain embodiments, an access management system controlling access to a resource is configured to determine and store a geographical location of a user whenever an access request for access to a resource is received by the access management system from the user. Over time, if access requests are received from the user from different locations, information regarding those geographical locations is stored by the access management system. Whenever a new access request is received from the user, information about the user's past stored geographical locations may be used by the access management system to authenticate the user. Various inventive embodiments are described herein, including methods, systems, non-transitory computer-readable storage media storing programs, code, or instructions executable by one or more processors, and the like.

In certain embodiments, the user may configure one or more questions and corresponding answers for specific locations. Whenever a new access request is received by the access management system from the user, a particular past location of the user is determined from the multiple locations stored by the access management system for the user. A user-configured question specified by the user for that particular past location is then determined and sent to the user. A response is received from the user including an answer to the user-configured question. A check is then made by the access management system to see if the answer received from the user in the response to the question matches the user-configured answer for that particular question for that particular past location. If the two answers match, then the location-based authentication is considered to be successful and the user is allowed to access the resource identified in the new access request. If the two answers do not match, then the location-based authentication is considered to have failed and the user is not allowed to access the resource identified in the new access request.

In certain embodiments, the location-based authentication may be used as a primary authentication mechanism for authenticating a user. In certain other embodiments, the location-based authentication may be used as a second factor authentication technique. In yet other embodiments, the location-based authentication may be used as part of an "n" factor authentication workflow, where "n" may be any number greater than two.

FIG. 1 illustrates an example of a computing environment that may incorporate an access management system 150 on a server 140. The access management system 150 may include one or more components. For example, the access management system 150 may include a login processor 152, a location-based authenticator 154, user-login data 156, user-questions information 158, or any combination thereof.

The login processor 152 may manage communications from one or more remote devices. For example, the login processor 152 may receive an access request from a remote device 110. In some examples, the remote device 110 may use a user interface 112 to communicate the access request to the login processor 152. In such examples, the access request may be communicated using a network 120 (e.g., the Internet). In some examples, the access request may be to gain access to a resource (e.g., an account, a database, a server, data, a device, application or the like) managed by the access management system 150. In such examples, the resource 130 may either be remote from or included with the server 140. In some examples, the access request may include one or more credentials for authentication by the access management system 150.

In some examples, the login processor 152 may determine to perform an additional factor of authentication, in addition to one or more authentications using the one or more credentials provided in the access request. In such examples, the determination may be based on a past location of the remote device 110 (e.g., a user attempts to login from a location that is different from one or more previous login locations), the one or more credentials, data in the access request, a time, a day, a number of login failures, a user attempts to login from a blacklisted IP address, or the like.

In response to determining to perform the additional factor of authentication, the login processor may send a request to the location-based authenticator 154 to begin operating. In some examples, the request may include the access request from the remote device 110. In such examples, the location-based authenticator 154 may identify a current location of the remote device 110 based on the access request. In other examples, the request may include the current location of the remote device 110. In other examples, the location-based authenticator 154 may send a message to the remote device 110 to receive the current location of the remote device 110. In some examples, the current location of the remote device 110 may be identified based on information included in the access request that indicates a location. For example, the access request may include coordinates from a global positioning system included or communicating with the remote device 110. In other examples, the current location of the remote device 110 may be identified by triangulating the remote device 110 using cell towers. In other examples, the current location of the remote device 110 may be identified by an IP address associated with the remote device 110.

The location-based authenticator 154 may determine a user-configured question based on a past location of the remote device 110. The past location may be a geographical location of the user when access requests were generated for the user requesting access by the user to some resource protected by an access management system. In some examples, the user-configured question may be determined by the location-based authenticator 154 using the user-login data 156. The user-login data 156 may include information of past logins by the remote device 110 and/or a user associated with the access request. Based on the user-login data 156, the location-based authenticator 154 may identify a past location of the remote device 110 and/or the user associated with the access request.

Figure 2:
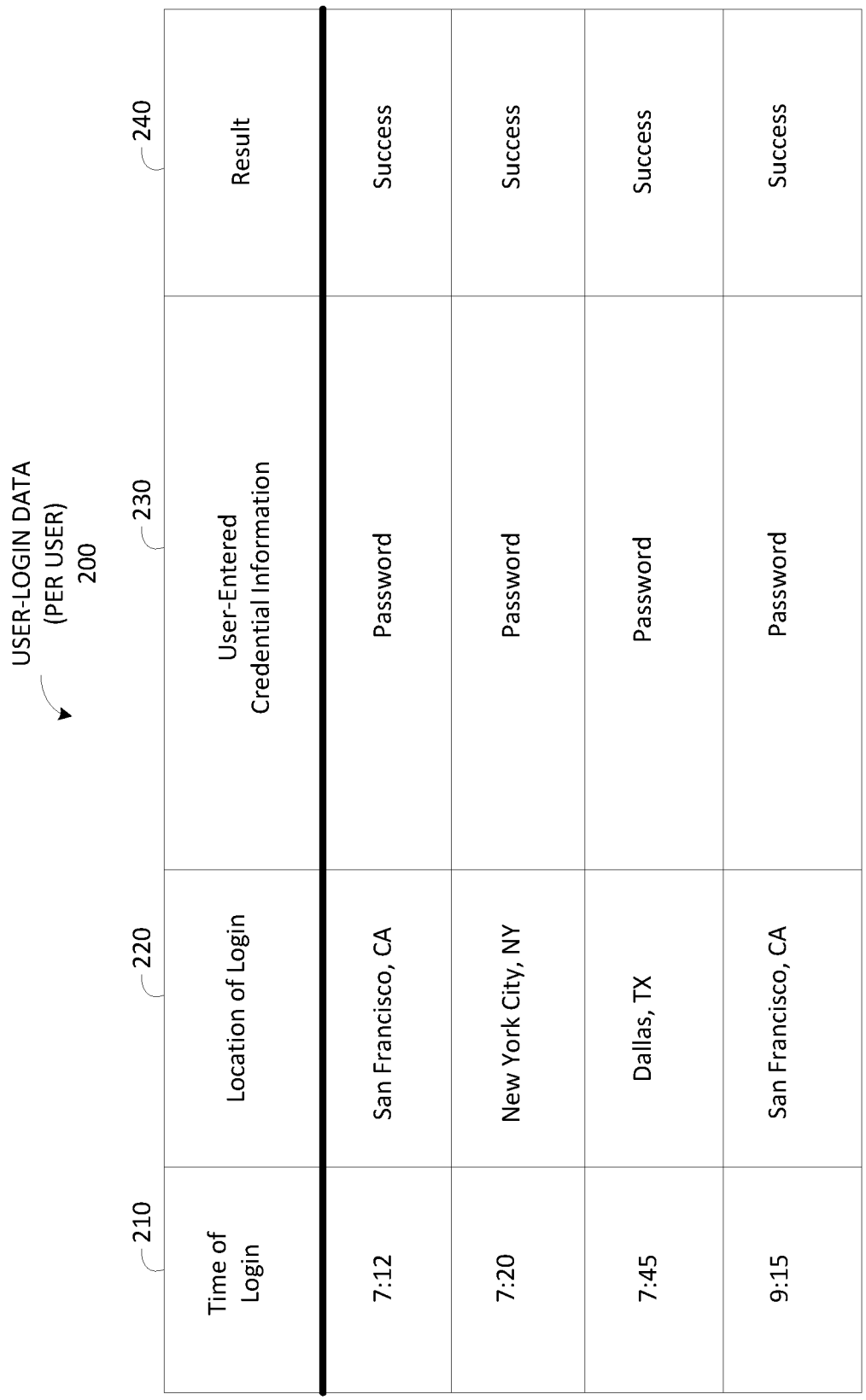
FIG. 2 illustrates an example of user-login data that may be stored by an access management system in certain embodiments.

FIG. 2 illustrates an example of user-login data 200 that may be stored by an access management system in certain embodiments. The user-login data 200 may be stored in different formats using different data structures (e.g., table, list, object, or the like). For example, in the embodiment depicted in FIG. 2, the user-login data 200 for a user may be stored as a table comprising multiple columns and rows. Each row in the table in FIG. 2 may be associated with a particular login attempt. While not intended to be limiting, a login attempt may identify a particular time, a location, user-entered credential information, and a result of the login attempt. For example, in FIG. 2, column 210 stores time information identifying a time that a user attempted to login to an access management system. While the particular time is depicted as a clock time, it should be recognized that the particular time may be in a different form, such as a date, a numbered order, or the like.

For each row, a location (shown in column 220 in FIG. 2) may be included. The location may indicate where a device was located when attempting to access the access management system. The location may be identified using a city name, a state name, a country name, a county name, a neighborhood, GPS coordinates, an address, or the like.

Each login attempt may also be associated with user-entered credential information (shown in column 230 in FIG. 2). User-entered credential information may include a username and/or password used for a login attempt. The user-entered credential information may also, or in the alternative, include a type of authentication that was attempted by a user for the login attempt. For example, an access management system may provide multiple methods for authentication. Accordingly, the type of authentication selected by a user may be stored for a login attempt.

Each row may also include a result of the login attempt (shown in column 240 in FIG. 2). The result may indicate whether a login attempt was successful. For example, "Success" may indicate that the login attempt was successful and "Unsuccessful" may indicate that the login attempt was not successful. It should be recognized that there may be more or less information in each row of the user-login data 200. It should also be recognized that there may be user-login data (similar to the user-login data 200) for each user and/or user device that has attempted to be authenticated by, or is registered with, the access management system.

Referring back to FIG. 1, in response to identifying the past location, the location-based authenticator 154 may identify a user-configured question associated with the past location using the user-questions information 158. The user-questions information 158 may include a list of locations, each location associated with one or more user-configured questions. In some examples, each location may also be associated with one or more answers (e.g., a user-configured answer or an answer determined for a user-configured question).

FIG. 3 illustrates an example of user-questions information 300 that may be stored by an access management system in certain embodiments. The user-questions information 300 for each user may be stored in different formats using different data structures (e.g., table, list, object, or the like). For example, in the embodiment depicted in FIG. 3, the user-questions information 300 for a user may be stored as a table comprising multiple columns and rows. Each row in the table in FIG. 3 may identify a particular location, which may be a past location of the user, and store user-configured questions and corresponding user-configured answers for that particular location. For example, in FIG. 3, column 310 stores location information identifying past locations recorded by an access management system for a user. These locations may be recorded and stored whenever an access request is received from the user. In certain embodiments, the user may proactively specify locations, even if the user has not generated access requests from those locations and the locations have not been associated with the user by the access management system. The locations may be identified using city names, state names, country names, county names, neighborhoods, GPS coordinates, addresses, and the like.

For each location, a user may configure one or more questions (shown in column 320 in FIG. 3) that are specific to and associated with the location. A user-configured question may be a question that was submitted for a location by the user. In certain embodiments, instead of having to specify a question for each location, the user may specify a single "same" question that is to be associated with multiple locations. For example, the question may be "What is your favorite restaurant in this location?" and this question may be associated with multiple locations in user-questions information 300 for that user.

In some examples, for each user-configured question for a location, the user-questions information 300 may also include a user-configured answer for that question for that location. For example, as depicted in FIG. 3, user-configured answers to user-configured questions for specific locations are stored in column 330.

In certain embodiments, a particular user-configured question for a particular location may not have a user-configured answer. In such a scenario, the particular user-configured question may be such that the correct answer to the user-configured question may be determined by the access management system using search services such as Google, Microsoft Bing, and the like. For example, the particular user-configured question may ask: "What pro football team is located in my last location?" Using a search service, a correct answer of "the Dallas Cowboys" may be determined.

It should be recognized that the user-questions information 300 example depicted in FIG. 3 is not intended to be limiting. In alternative embodiments, more or less information than that shown in FIG. 3 may be included as part of user-questions information 300. It should also be recognized that there may be location information (similar to the location information 300) for each user and/or user device that has been authenticated by the access management system.

Figure 4:
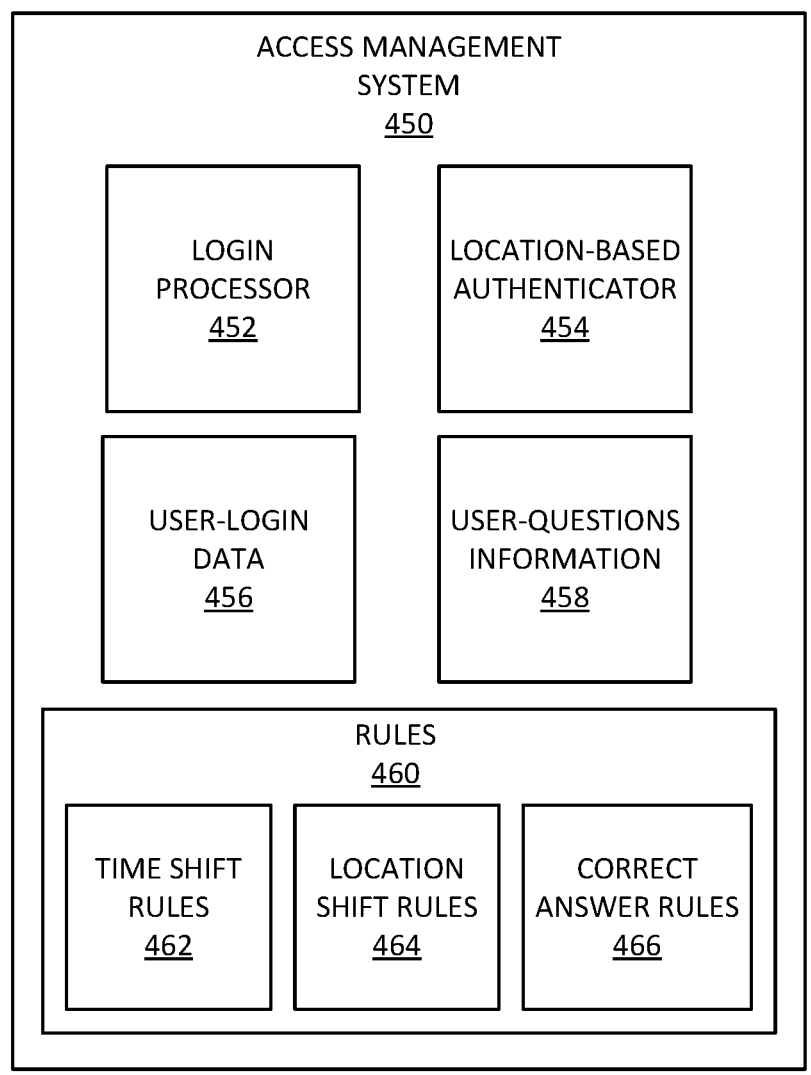
FIG. 4 illustrates an example of an access management system with a rules component.

FIG. 4 illustrates an example of an access management system 450 with a rules component 460. The rules component 460 may augment functionality of one or more components of the access management system 450 based on one or more user-configured rules set by a user. In some examples, the rules component 460 may include one or more time-shift rules 462, one or more location shift rules 464, one or more correct answer rules 466, or any combination thereof.

The time shift rules 462 may augment how a location-based authenticator 454 identifies a past location in user-login data 456. In particular, the time shift rules 462 may indicate a number of locations in the past to go back for a past location. For example, rather than identifying the last new location in the user-login data 456, the location-based authenticator 454 may identify a location corresponding to a number of locations in the past to go back. For example, if the number is two, the past location for the user-login data 200 would be New York City, N.Y., rather than San Francisco, Calif.

The location shift rules 464 may also augment how the location-based authenticator 454 identifies a past location in the user-login data 456. In particular, the location shift rules 464 may indicate a distance to change the past location. For example, the past location may be modified by a number of miles such that the past location is a new location. For example, if the distance is set at 30 miles southwest, the past location may be changed from San Francisco, Calif., to Palo Alto, Calif. In some examples, the distance may be set for each location. In other examples, the distance may be set for all locations. In yet other examples, the distance may be set such that the distance corresponds to a city near the past location. For example, the distance may be set to be the nearest city to a location.

FIG. 5 illustrates another example of user-questions information 500 for a user. The user-questions information 500 may be a data structure (e.g., table, list, object, or the like) that includes information associated with one or more locations for the user (similar to the user-questions information 300). However, unlike the user-questions information 300, the user-questions information 500 may include location shift information (shown in column 540 in FIG. 5). The location shift information may identify a rule to apply when a location is identified as a past location. For example, if San Francisco, Calif., is the past location identified, the location shift information 540 may cause the past location to change to Palo Alto, Calif. In such an example, an answer to a user-configured question 520 may be Evvia rather than In n' Out. It should be recognized that other rules, besides distance, may be used to identify how to shift the past location.

Referring back to FIG. 4, the correct answer rules 466 may augment a determination of a correct answer provided in response to a user-configured question. In particular, the correct answer rules 466 may identify particular answers that, while technically correct in response to the user-configured question, would be determined to be incorrect (this is sometimes referred to as filtering). For example, an answer of a common fast food restaurant could be given in response to a user-configured question. In such an example, common fast food restaurants may be prohibited as a correct answer, and thus, the answer of the common fast food restaurant would be incorrect. The correct answer rules 466 may apply when there is not a user-configured answer to a user-configured question.

FIGS. 6-9 illustrate various flowcharts depicting methods for performing location-based authentication according to certain embodiments. Flowcharts 600, 700, 800, and 900 are each illustrated as a logical flow diagram, the operation of which represents a sequence of operations that may be implemented in hardware, software, or combinations thereof. The software may be implemented as computer-executable instructions or code or programs that may be stored on one or more non-transitory computer-readable storage media. The software may be executed by one or more processors of one or more systems. Execution of instructions or code or programs may cause the various operations to be performed. The order in which the operations are described is not intended to be construed as a limitation, and any number of the described operations may be combined in any order and/or in parallel to implement the processes.

Figure 6:
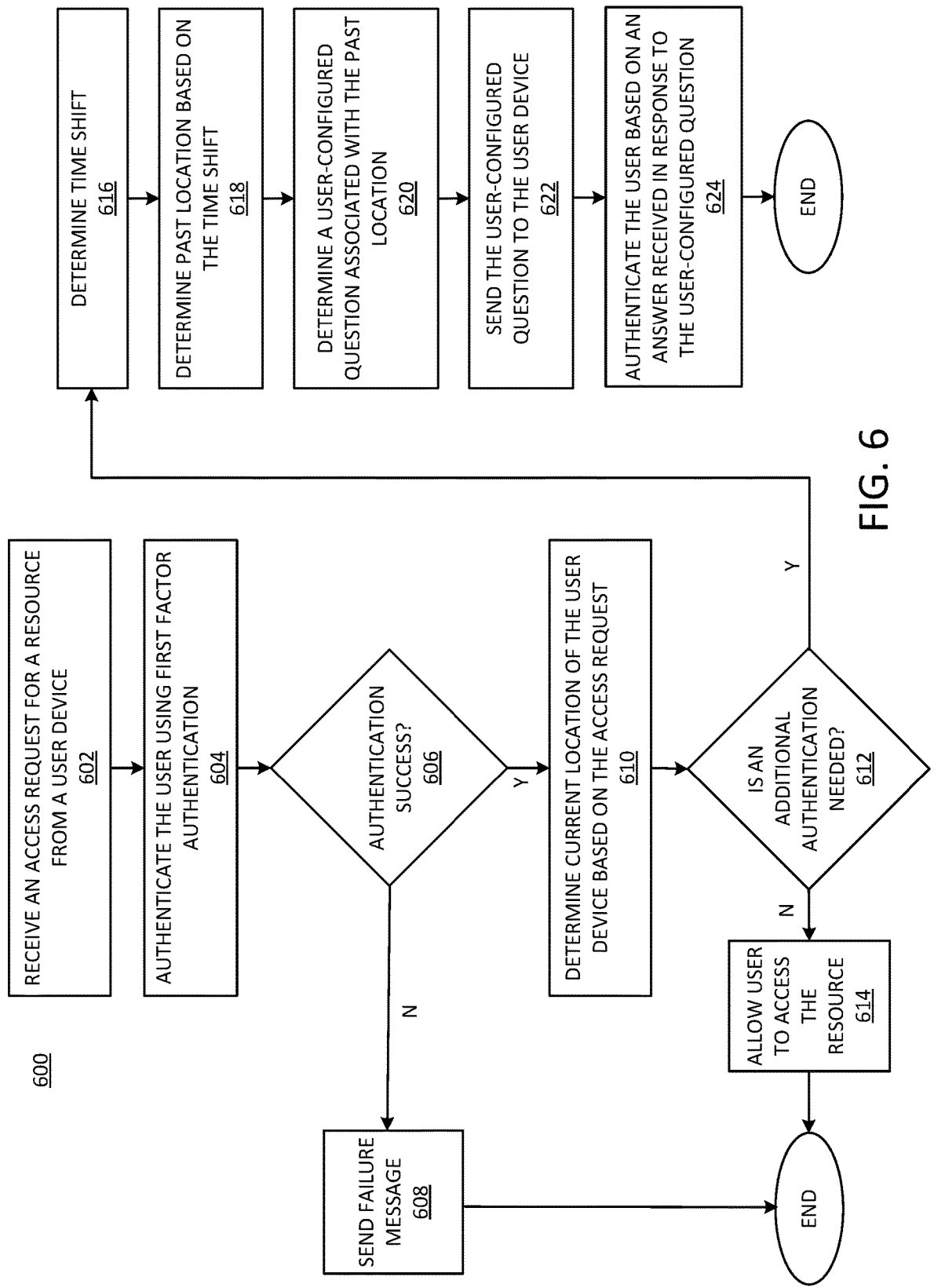
FIG. 6 depicts a simplified flowchart depicting processing performed for authenticating a user based upon locations according to certain embodiments.

FIG. 6 depicts a simplified flowchart 600 depicting processing performed for authenticating a user based upon locations according to certain embodiments. The processing depicted in FIG. 6 may be implemented in software (e.g., code, instructions, program) executed by one or more processing units (e.g., processors, cores, or the like) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, such as the embodiment depicted in FIG. 1, the processing depicted in FIG. 6 may be performed by access management system 150.

In some examples, the processing may be initiated at 602 when an access request is received from a user. The access request, for example, may be to access a resource that is managed and protected by an access management system such as access management system 150 depicted in FIG. 1. For example, the access request may be to access a system (e.g., to log in to the system), an application, an account (e.g., to log into the account), a device, a document, a data object, or the like. The access request received in 602 may include one or more authentication credentials (e.g., a user name, a password, a retina scan, a fingerprint, a signal from a remote device, or the like) of the user requesting the access and/or of the user device that originated the access request.

The access request in 602 may be received from a device used by the user to generate the access request. For example, the access request may be generated as a result of the user trying to log into an account using the user's mobile device. The access management system may receive the access request from the device. In certain embodiments, the access request may also include information about the device that originated the access request. For example, the access request may comprise device identification information, the device's location, and the like.

At 604, the user may be authenticated using first factor authentication. The authentication performed in 604 may be based upon information included in the access request received in 602. For example, the authentication may be based upon the one or more access credentials included in the access request. In some examples, the authentication in 604 may be performed using one or more factors such as one or more knowledge factors, one or more possession factors, one or more inherence factors, one or more location factors, one or more time factors, and the like, or any combinations thereof. For example, a knowledge factor may be based on information that a user provides to log in (e.g., a user name, an identification, a password, a PIN, an answer to a question, or the like), a possession factor may be based on an item in possession of a user (e.g., security token, a one-time password token, a key fob, an identification card, a SIM card, or the like), an inherence factor may be based on a biological trait of a user (e.g., retina scan, iris scan, fingerprint scan, finger vein scan, facial recognition, voice recognition, hand geometry, earlobe geometry, or the like), a location factor may be based on a current location of the user when the access request is generated, and a time factor may be based on a current time (e.g., whether the current time is consistent with a schedule, whether a distance between locations based on the current time is possible, or the like).

At 606, a determination may be made whether the authentication performed in 604 is successful. If it is determined in 606 that the authentication in 604 was not a success, the access management system may send a failure message to the user device at 608 as a response to the access request, and processing may then end. In the case of authentication failure, the user is not allowed to access the resource requested in the access request received in 602.

If it is determined in 606 that the authentication in 604 was successful, at 610, a current location of the user at the time of generation of the access request may be determined. In certain embodiments, the location of the user corresponds to the location of the user device used by the user to trigger the access request. For example, the access request may have been generated when the user attempted to log into the user's office email account using the user's home computer. Accordingly, the location of the home computer corresponds to the location of the user when the access request was generated.

In certain embodiments, in 610, the current location may be determined based upon information included in the access request received in 602. For example, the access request may include location information of the user device such as in the form of global positioning system (GPS) coordinates or information that indicates the current location of the user device when the access request was sent. In other examples, the access request may include other forms of information to determine the current location of the user device. For example, the location information in the access request may be used to identify an area (e.g., a city, a state, a country, or the like) in which the user device is located.

As part of the processing performed in 610, the current location information that is determined may be stored by the access management system and associated with the user. For example, in the embodiment depicted in FIG. 1, access management system 150 may store the current location determined in 610 for the user as part of user locations information 158.

At 612, a determination is made whether an additional authentication technique (e.g., a second factor authentication) is to be used for authenticating the user, where the additional authentication technique is based upon past locations of the user (referred to herein as "location-based authentication). There are various conditions under which it may be determined in 612 that the additional authentication using location-based authentication is to be performed. For example, it may be determined that location-based authentication is to be performed when there is a question about the identity of a user. For example, if it is determined that the current location of the user determined in 610 is different from the location of the user during previous access requests (i.e., previous to the access request received in 602), there may be a question raised whether it is the same user or someone masquerading as the user. In this case, it may be determined in 612 that the additional authentication using location-based authentication is to be performed. Other situations that may trigger location-based authentication include without restrictions: determining that the user has exceeded a threshold number of login attempts; the user attempts to login from a blacklisted IP address; or the like.

In certain embodiments, the determination in 612 may be based upon one or more policies configured for the access management system. For example, these policies may identify one or more conditions, which when met, trigger the location-based authentication as an additional authentication.

In some examples, if it is determined in 612 that an additional authentication using location-based authentication is not needed, then at 614, the user is allowed to access the resource requested in the access request received in 602 in FIG. 6. For example, if the user is requesting to log into an account, then the user login procedures may be allowed and completed in 614. Optionally, a message may be sent to the user in 614 that the user authentication was successful. Processing may then end.

If it is determined in 612 that an additional authentication using location-based authentication is to be performed, then in certain embodiments, the location-based authentication may be performed according to 616, 618, 620, 622, and 624 depicted in FIG. 6.

At 616, a time shift to be used for performing the location-based authentication is determined. The time shift is used to determine which past user location is to be used for performing location-based authentication.

In some examples, the time shift may be expressed as a number of locations in the past to go back to select a location for location-based authentication. For example, in the simplest case, the time shift is "1", which corresponds to the last recorded location of the user that is different from the current location determined in 610. As another example, if the time shift is "3", this corresponds to the last-to-last-to-last recorded location for the user. As yet another example, if the time shift is "0" (zero), then the current location determined in 610 is used for the location-based authentication. In certain embodiments, time shift may default to "1", i.e., the last location.

In certain embodiments, the time shift may be expressed as a certain period or length of time in the past from the present time. In some embodiments, the time the access request was received in 602 may be taken as the current time and used to determine the time shift. For example, the time shift in 616 may be determined to be a year ago, 6-months ago, a week-ago, zero time (i.e., current time is used), and the like.

In certain embodiments, the computation of the time shift in 616 may be driven by policies configured for the access management system. For example, policies may be configured for the access management system that determine whether the time shift is to be computed using a number of past locations, using a time period, or some other technique. Policies may also be configured to compute the time shift.

At 618, a past location for the user is determined based upon the time shift determined in 616. For example, if the time shift is the last location (which may be the default setting), then the last location of the user that is different from the current location (as determined in 610) is determined in 618. If the time shift is two locations in the past, then the last-to-last location of the user that is different from the current location (as determined in 610) is determined in 618. As another example, if the time shift is time-based (e.g., a year ago), then a previous time is computed by subtracting the time shift from the current time. The past location that is determined in 618 is then the location of the user at (or proximal to) the previous time.

In certain embodiments, the access management system may store information about past locations of the user. An example of this stored information is depicted in FIG. 3. This stored information may then be used in 618 to determine the past location. For example, in the embodiment depicted in FIG. 1, user locations information 158 accessible to access management system 150 may be used to determine the past location in 618

At 620, a user-configured question associated with the past location determined in 618 may be determined. In a simplified scenario, a single question may be associated with the past location and that question is determined in 620. In some other scenarios, multiple user-configured questions may be associated with the past location. In such scenarios, a selection logic may be used to determine which specific question to select in 620. As one example, the user-configured question determined in 620 may be selected randomly from the multiple user-configured questions for the past location. As another example, the user-configured question determined in 620 may be selected based on previous selected questions for the past location or for another past location. For example, if a first user-configured question associated with the past location has already been asked in the past, a different user-configured question associated with the past location may be determined in 620.

In certain embodiments, the same user-configured question may be configured for all past locations. For example, the same question may be "What is your favorite restaurant at <past location>?", where <past location> is the past location determined in 618. This single question may be configured as the default question. In this case, the correct answer would be different for different past locations, and that answer may be used to authenticate the user in 624.

At 622, the user-configured question determined in 620 is communicated to the user. For example, the user-configured question determined in 620 may be sent to the user device from which the access request was received in 602.

At 624, the answer received from the user in response to the question communicated to the user in 655 is used to authenticate the user. Further details related to the processing performed in 624 is depicted in FIGS. 7 and 8, and described below.

In the embodiment depicted in FIG. 6 and described above, location-based authentication is performed as a second factor authentication. This is however not intended to be limiting. In certain embodiments, location-based authentication may be the only authentication that is performed. In yet other embodiments, location-based authentication may be performed as part of an "n" factor authentication workflow, where "n" may be any number greater than two.

An access management system may provide various ways that enable a user to provide user-configured questions and corresponding user-configured answers for specific locations. For example, when a user's current location is determined (such as in 610 in FIG. 6) and the user has been authenticated, the access management system may prompt the user to provide one or more user-configured questions and corresponding answers for the current location. In certain embodiments, upon determining a particular user location and upon further determining that no user-configured question and corresponding answer has been previously configured for that particular user location, the access management system may automatically prompt the user to configure a question and provide a corresponding answer for that particular location. A user may also be allowed to change previously configured questions for a location (current or past locations) and/or or their corresponding answers.

Figure 7:
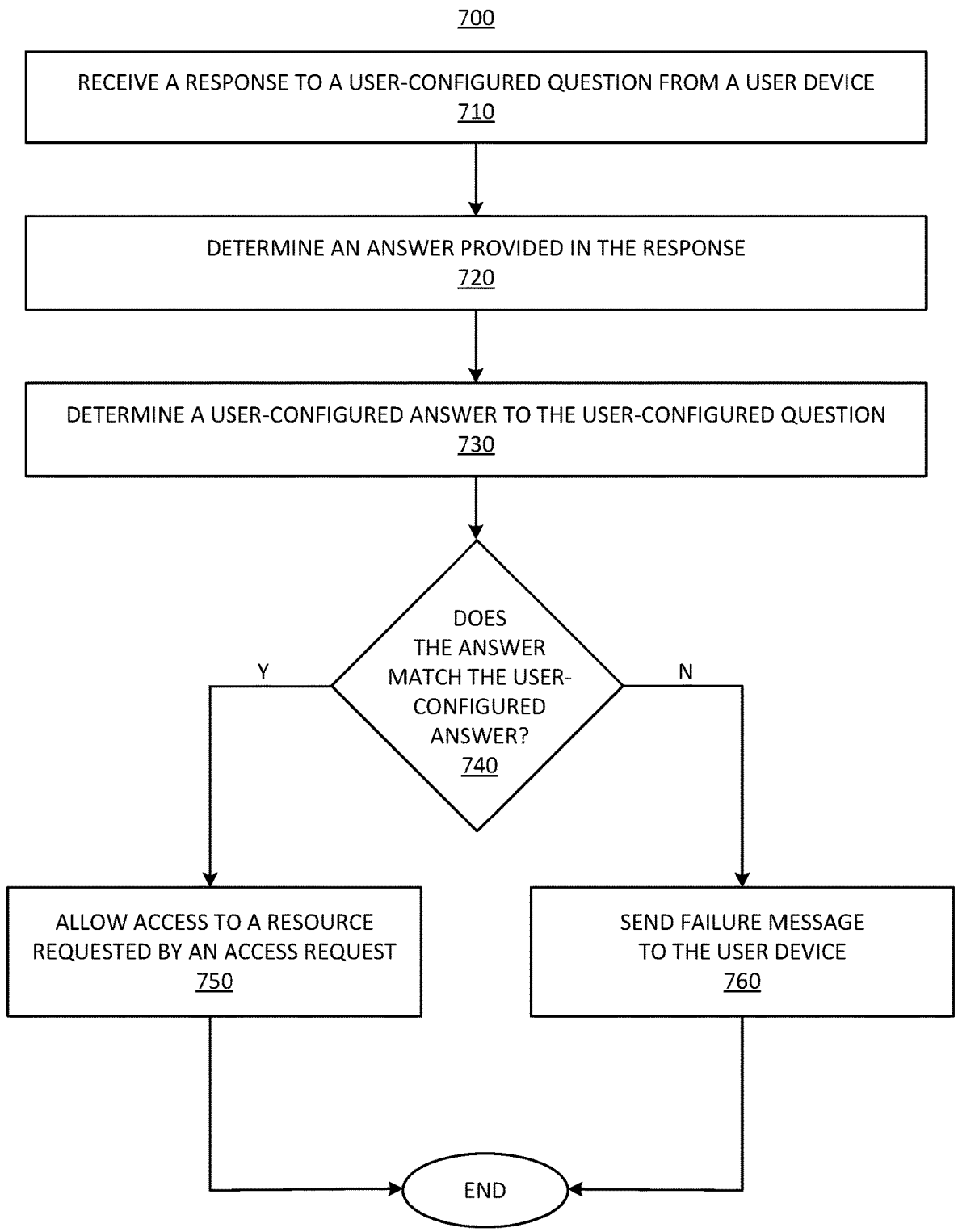
FIG. 7 depicts a simplified flowchart depicting a method for performing location-based authentication according to certain embodiments.
Figure 8:
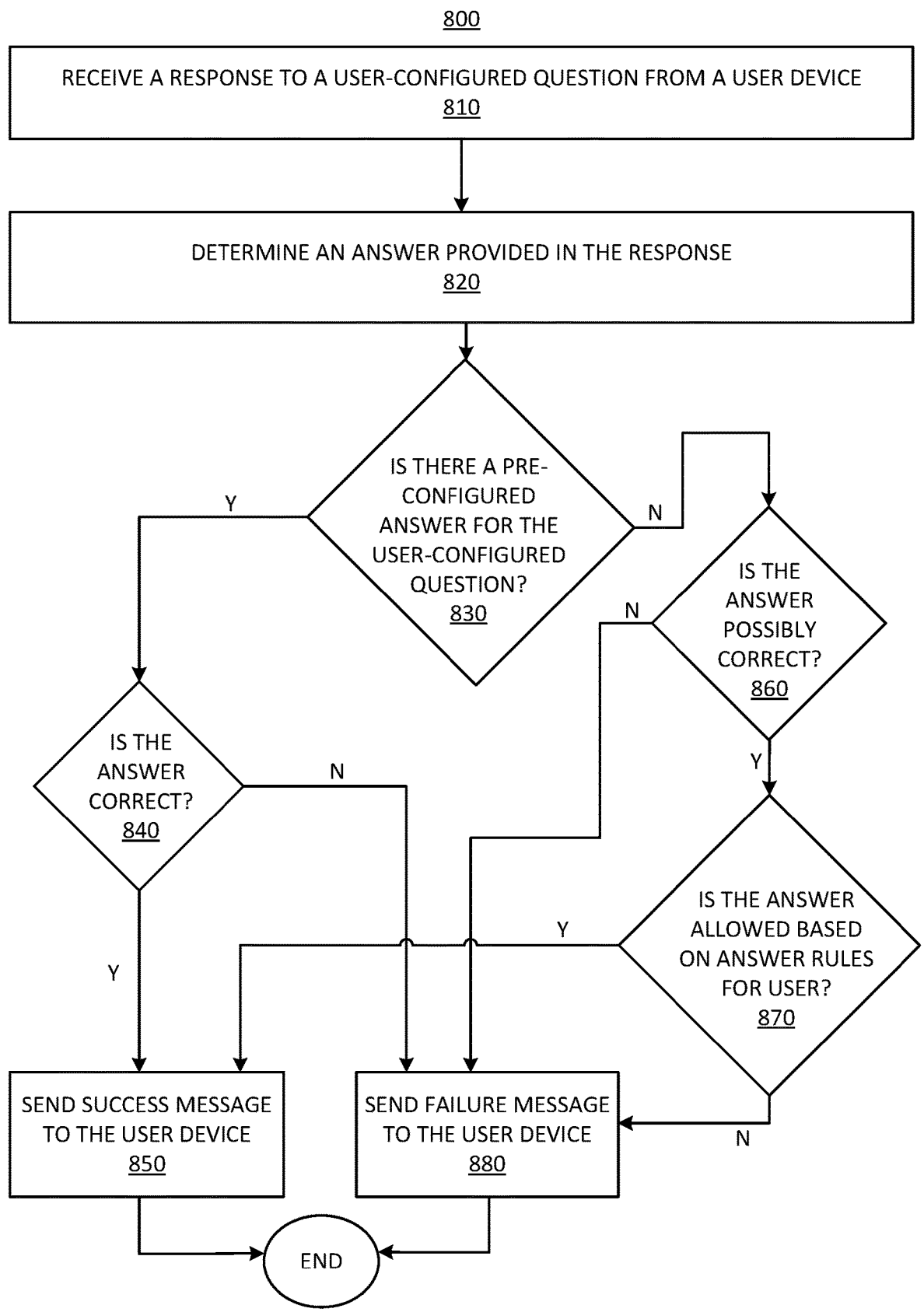
FIG. 8 depicts a simplified flowchart depicting another method for performing location-based authentication according to certain embodiments.

FIG. 7 depicts a simplified flowchart 700 depicting a method for performing location-based authentication according to certain embodiments. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In certain alternative embodiments, the steps may be performed in some different order or some steps may also be performed in parallel. In certain embodiments, such as the embodiment depicted in FIG. 1, the processing depicted in FIG. 7 may be performed by the access management system 150. In certain embodiments, the processing depicted in FIG. 7 may be performed in 624 in FIG. 6.

At 710, a response may be received from a user in response to the user-configured question communicated to the user in 622 in FIG. 6. For example, the response in 710 may be received from a user device and may include an answer to the user-configured question sent to the user. At 720, the answer is extracted from the response received in 710.

At 730, the user-configured answer to the user-configured question sent to the user in 622 is determined. In certain embodiments, the user-configured answer may be determined from the user-questions information configured by the user and stored for the user by the access management system. An example of user-questions information is depicted in FIG. 3 and described above.

At 740, a check is made to see if the answer extracted in 720 matches the user-configured answer determined in 730. If the two answers match, then the location-based authentication for the user is considered to be successful and processing continues with 750 where the user is allowed to access the resource requested in the access request received in 602 in FIG. 6. For example, if the user is requesting to log into an account, then the user login procedures may be allowed and completed in 750. Optionally, a message may be sent to the user in 750 that the user authentication was successful. Processing may then end.

If it is determined in 740 that the answer extracted from the response in 720 does not match the user-configured answer determined in 730, then the authentication is considered to have failed. At 760, a message may be sent to the user informing the user of the failed authentication. The failure message may be sent to the user device from which the access request was received in 602 in FIG. 6. Upon failed authentication, the user is not allowed to access the resource requested in the access request received in 602 in FIG. 6.

FIG. 8 depicts a simplified flowchart 800 depicting another method for performing location-based authentication according to certain embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel. In certain embodiments, such as the embodiment depicted in FIG. 1, the processing depicted in FIG. 8 may be performed by the access management system 150. In certain embodiments, the processing depicted in FIG. 8 may be performed in 624 in FIG. 6.

In some examples, the processing depicted in FIG. 8 may occur after the processing depicted in FIG. 6 sends the user-configured question to the user device. In some examples, the processing depicted in FIG. 8 may occur instead of the processing depicted in FIG. 7.

At 810, a response to a user-configured question may be received from a user device. The response may include an answer. At 820, the answer included in the response may be determined. At 830, it may be determined whether there is a pre-configured answer for the user-configured question. If there is a pre-configured answer, processing depicted in FIG. 8 may perform similarly to the processing depicted in FIG. 7.

If there is not a pre-configured answer for the pre-configured question, the access management system, at 870, may determine whether the answer provided in the response is possibly correct. In some examples, an answer is possibly correct when the answer is identified as one of one or more answers that are correct for the pre-configured question. In such examples, the one or more answers that are correct for the pre-configured question may be identified without input by a user. For example, the access management system may search for the pre-configured question to determine answers that other users have entered for the pre-configured question. The other users might have entered the answers using the access management system or on some other network (including the Internet using a public forum).

At 880, if the answer provided in the response is not correct, a failure message may be sent to the user device similar to that in the processing depicted in FIG. 7. If the answer provided in the response is possibly correct, the access management system may determine whether there are one or more answer rules for the user. An answer rule may cause a possibly correct answer to fail authentication, and have the processing depicted in FIG. 8 proceed to send a failure message, at 880, similar to that in the processing depicted in FIG. 7.

In some examples, the failure message may include the reason that the answer failed authentication (e.g., failed to pass one or more answer rules). An example of an answer rule is that a fast food restaurant cannot be a favorite restaurant in a city. If the answer is allowed based on the one or more answer rules, a success message (and/or request message) may be sent to the user device, at 850, similar to that in the processing depicted in FIG. 7.

Figure 9:
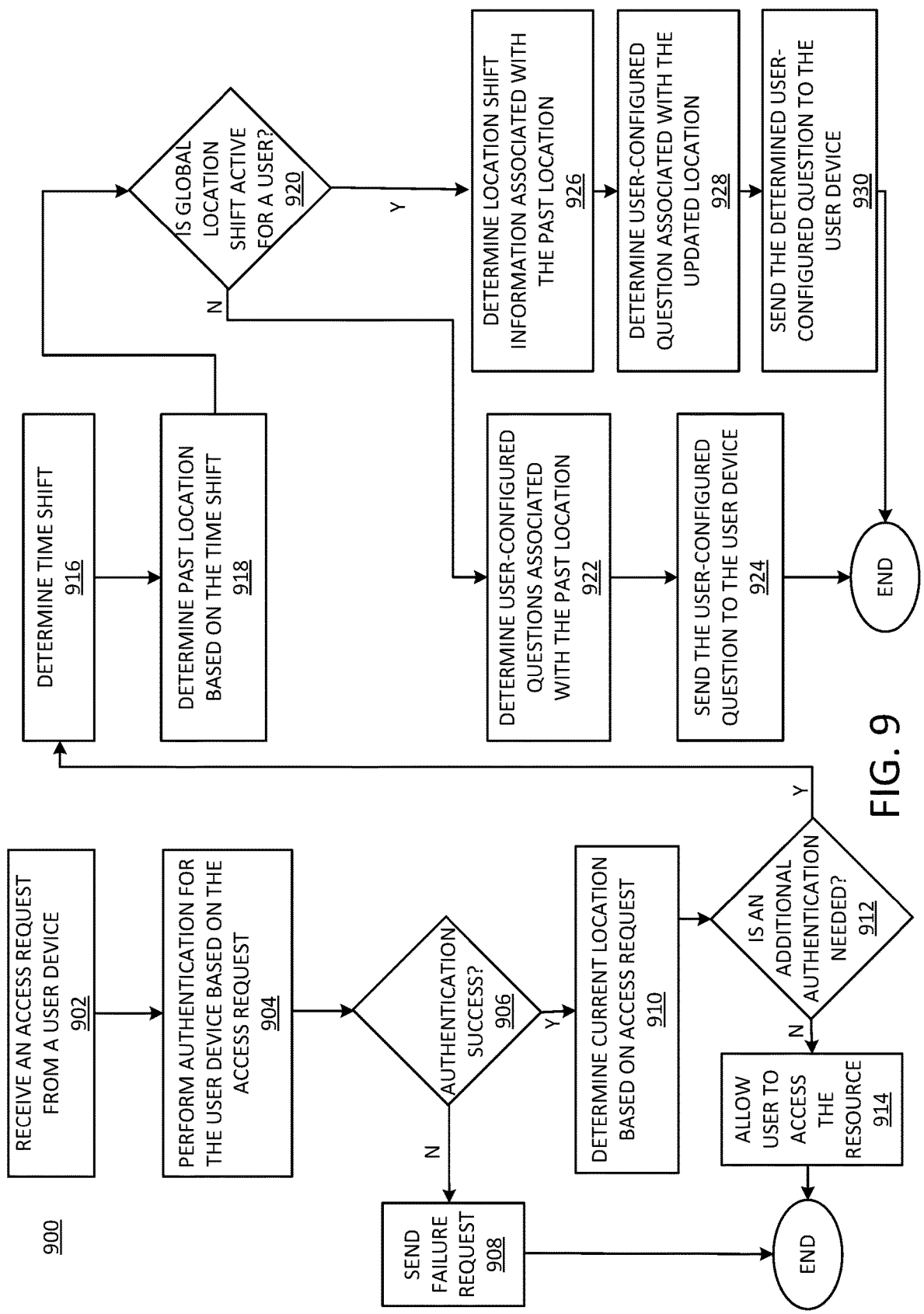
FIG. 9 depicts a simplified flowchart depicting a method for performing location-based authentication using a location shift option according to certain embodiments.

FIG. 9 depicts a simplified flowchart 900 depicting a method for performing location-based authentication using a location shift option according to certain embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order or some steps may also be performed in parallel. In certain embodiments, such as the embodiment depicted in FIG. 4, the processing depicted in FIG. 9 may be performed by an access management system 450. In some examples, the location shift may change a past location that is used to determine a user-configured question. For example, while a past location may be a particular location, the location shift may change the particular location by an amount defined by the location shift.

In some examples, the processing depicted in FIG. 9 may be similar to the processing depicted in FIG. 6, including 902, 904, 906, 908, 910, 912, 914, and 916. After a past location is determined based on a time shift at 916, the processing depicted in FIG. 9 may differ from the processing depicted in FIG. 6. For example, at 918, it may be determined whether a global location shift is active for a user. The global location shift may be a setting that each user may set. For example, the global location shift may indicate whether location shifts should be applied to past locations. If the global location shift is not active for a user, the past location will not be shifted based on a location shift even if the location shift is included in user-questions information (e.g., user-questions information 500) for the past location. It should also be recognized that a location-specific location shift may indicate whether a location shift should be used for a particular past location. For example, a user may indicate that a particular location should or should not use a location shift. This indication may be regardless of whether the past location is associated with a shifted location. If the global location shift is not active, the processing depicted in FIG. 9 may continue similarly to the processing depicted in FIG. 6.

If the global location shift is active, location shift information associated with the past location may be determined at 926. In some examples, the location shift information may be determined by accessing location information for the user (e.g., the user-questions information 500). In such examples, a past location may include an attribute that indicates a location shift for the past location. For example, assuming that San Francisco, Calif. was determined to be the past location in 918, it may be seen from user-questions information 500 in FIG. 5 that there is a location shift of "30 miles southwest" associated with San Francisco, which points to a new past location, namely, Palo Alto, Calif. Thus, in this example, San Francisco, Calif. is determined as the initial past location in 918, which is then shifted to new past location, namely, Palo Alto, Calif. after applying the location shift. In some examples, there may not be a location shift for a past location. In such examples, the past location may be used as the location shift for the past location.

At 928, a user-configured question associated with the updated or new or shifted past location may be determined. Using the previous example, if Palo Alto, Calif. is determined to be the new shifted past location, then a user-configured question associated with Palo Alto, Calif. is determined in 928. At 930, the user-configured question determined in 928 may then be sent to the user as described in 622 of the processing depicted in FIG. 6.

Figure 10:
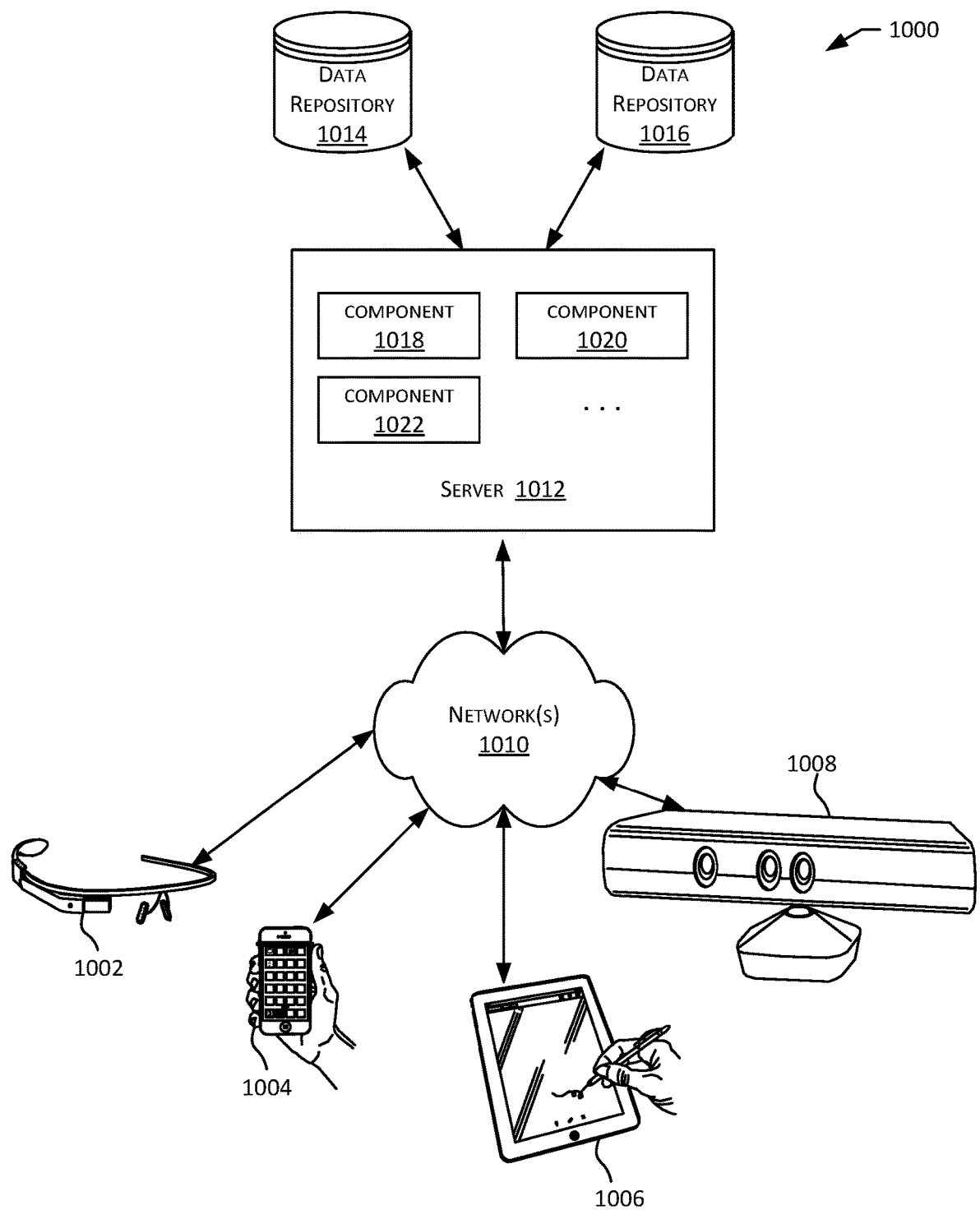
FIG. 10 depicts a simplified diagram of a distributed system.

FIG. 10 depicts a simplified diagram of a distributed system 1000. In the illustrated example, distributed system 1000 includes one or more client computing devices 1002, 1004, 1006, and 1008 (e.g., remote device 110 in FIG. 1), coupled to a server 1012 (e.g., server 140 in FIG. 1) via one or more communication networks 1010 (e.g., network 120 in FIG. 1). Clients computing devices 1002, 1004, 1006, and 1008 may be configured to execute one or more applications.

In various examples, server 1012 may be adapted to run one or more services or software applications that enable a location-based multifactor authentication (e.g., access management system 150), as described in this disclosure. For example, in certain examples, server 1012 may receive an access request from a user device. Server 1012 may then authenticate the user device for a resource (e.g., resource 130 in FIG. 1) based on the access request. For example, the access request may include one or more credentials that are compared to one or more credentials stored on the server 1012. Server 1012 may also identify a current and past location for the user device to identify a user-configured question to send to the user device. Server 1012 may receive a response to the user-configured question from the user device, the response including an answer. Server 1012 may determine whether the answer is correct, and authorize access to the resource based on the answer.

In certain examples, server 1012 may also provide other services or software applications that may include non-virtual and virtual environments. In some examples, these services may be offered as web-based or cloud services, such as under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, server 1012 may include one or more components 1018, 1020 and 1022 that implement the functions performed by server 1012. These components may include software components that may be executed by one or more processors, hardware components, or combinations thereof. It should be appreciated that various different system configurations are possible, which may be different from distributed system 1000. The example shown in FIG. 10 is thus one example of a distributed system for implementing an example system and is not intended to be limiting.

Users may use client computing devices 1002, 1004, 1006, and/or 1008 to execute one or more applications, which may generate one or more storage requests that may then be serviced in accordance with the teachings of this disclosure. A client device may provide an interface (e.g., user interface 112 in FIG. 1) that enables a user of the client device to interact with the client device. The client device may also output information to the user via this interface. Although FIG. 10 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1010 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1010 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 may include one or more virtual machines running virtual operating systems, or other computing architectures involving virtualization such as one or more flexible pools of logical storage devices that may be virtualized to maintain virtual storage devices for the server. In various examples, server 1012 may be adapted to run one or more services or software applications that provide the functionality described in the foregoing disclosure.

The computing systems in server 1012 may run one or more operating systems including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA servers, database servers, and the like. Exemplary database servers include without limitation those commercially available from Oracle®, Microsoft®, Sybase®, IBM® (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more data repositories 1014, 1016. These data repositories may be used to store data and other information in certain examples. For example, one or more of the data repositories 1014, 1016 may be used to store information such as information related to storage virtual machines, information mapping application IDs to application to selected storage virtual machines, and other information used by server 1012 when performing authentication functions. Data repositories 1014, 1016 may reside in a variety of locations. For example, a data repository used by server 1012 may be local to server 1012 or may be remote from server 1012 and in communication with server 1012 via a network-based or dedicated connection. Data repositories 1014, 1016 may be of different types. In certain examples, a data repository used by server 1012 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1014, 1016 may also be used by applications to store application data. The data repositories used by applications may be of different types such as, for example, a key-value store repository, an object store repository, or a general storage repository supported by a file system.

Figure 11:
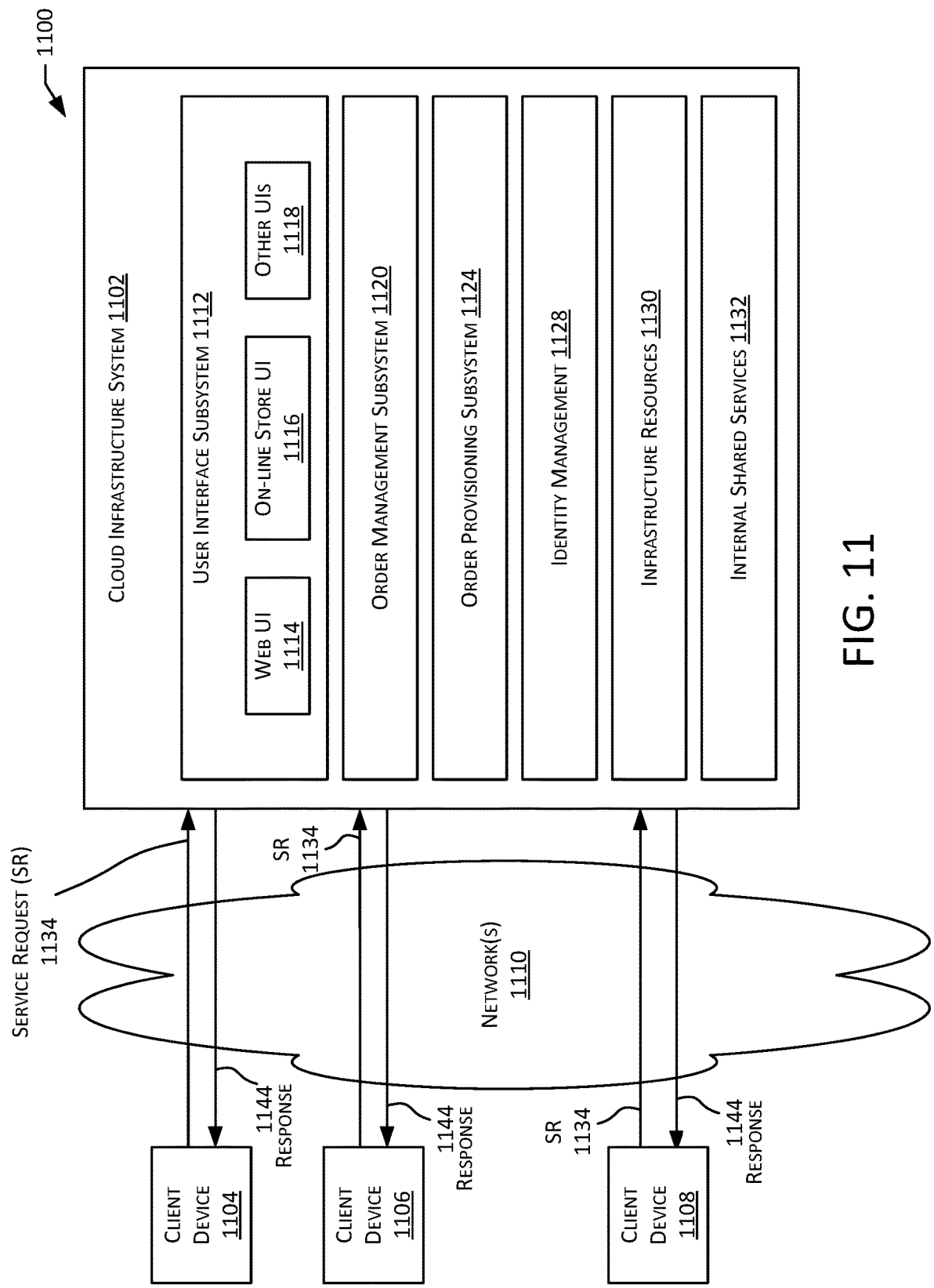
FIG. 11 is a simplified block diagram of a cloud-based system environment in which various authentication-related services may be offered as cloud services.

In certain examples, the authentication-related functionalities described in this disclosure may be offered as services via a cloud environment. FIG. 11 is a simplified block diagram of a cloud-based system environment in which various authentication services may be offered as cloud services, in accordance with certain examples. In the example depicted in FIG. 11, cloud infrastructure system 1102 may provide one or more cloud services that may be requested by users using one or more client computing devices 1104, 1106, and 1108. Cloud infrastructure system 1102 may comprise one or more computers and/or servers that may include those described above for server 1012. The computers in cloud infrastructure system 1102 may be organized as general purpose computers, specialized server computers, server farms, server clusters, or any other appropriate arrangement and/or combination.

Network(s) 1110 may facilitate communication and exchange of data between clients 1104, 1106, and 1108 and cloud infrastructure system 1102. Network(s) 1110 may include one or more networks. The networks may be of the same or different types. Network(s) 1110 may support one or more communication protocols, including wired and/or wireless protocols, for facilitating the communications.

The example depicted in FIG. 11 is only one example of a cloud infrastructure system and is not intended to be limiting. It should be appreciated that, in some other examples, cloud infrastructure system 1102 may have more or fewer components than those depicted in FIG. 11, may combine two or more components, or may have a different configuration or arrangement of components. For example, although FIG. 11 depicts three client computing devices, any number of client computing devices may be supported in alternative examples.

The term cloud service is generally used to refer to a service that is made available to users on demand and via a communication network such as the Internet by systems (e.g., cloud infrastructure system 1102) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain examples, cloud infrastructure system 1102 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1102 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1102. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1102. Cloud infrastructure system 1102 then performs processing to provide the services requested in the customer's subscription order. For example, a user may request the cloud infrastructure system to register an application, as described above, and provide authentication-related services to the application per the application's specified authentication-related requirements. Cloud infrastructure system 1102 may be configured to provide one or even multiple cloud services.

Cloud infrastructure system 1102 may provide the cloud services via different deployment models. In a public cloud model, cloud infrastructure system 1102 may be owned by a third party cloud services provider and the cloud services are offered to any general public customer, where the customer may be an individual or an enterprise. In certain other examples, under a private cloud model, cloud infrastructure system 1102 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1102 and the services provided may be shared by several organizations in a related community. Various other models such as hybrids of the above mentioned models may also be used.

Client computing devices 1104, 1106, and 1108 may be of different types (such as devices 1002, 1004, 1006, and 1008 depicted in FIG. 10) and may be capable of operating one or more client applications. A user may use a client device to interact with cloud infrastructure system 1102, such as to request a service provided by cloud infrastructure system 1102. For example, a user may use a client device to request an authentication-related service described in this disclosure.

In some examples, the processing performed by cloud infrastructure system 1102 for providing authentication-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1102 for determining which storage virtual machine is to be selected for a particular application based upon the application's stated authentication-related requirements. The data used for this analysis may include structured data (e.g., data stored in a database or structured according to a structured model) and/or unstructured data (e.g., data blobs (binary large objects)).

As depicted in the example in FIG. 11, cloud infrastructure system 1102 may include infrastructure resources 1130 that are utilized for facilitating the provision of various cloud services offered by cloud infrastructure system 1102. Infrastructure resources 1130 may include, for example, processing resources, storage or memory resources, networking resources, and the like. In certain examples, the storage virtual machines that are available for servicing storage requested from applications may be part of cloud infrastructure system 1102. In other examples, the storage virtual machines may be part of different systems.

In certain examples, to facilitate efficient provisioning of these resources for supporting the various cloud services provided by cloud infrastructure system 1102 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1102 may itself internally use services 1132 that are shared by different components of cloud infrastructure system 1102 and which facilitate the provisioning of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1102 may comprise multiple subsystems. These subsystems may be implemented in software, or hardware, or combinations thereof. As depicted in FIG. 11, the subsystems may include a user interface subsystem 1112 that enables users or customers of cloud infrastructure system 1102 to interact with cloud infrastructure system 1102. User interface subsystem 1112 may include various different interfaces such as a web interface 1114, an online store interface 1116 where cloud services provided by cloud infrastructure system 1102 are advertised and are purchasable by a consumer, and other interfaces 1118. For example, a customer may, using a client device, request (service request 1134) one or more services provided by cloud infrastructure system 1102 using one or more of interfaces 1114, 1116, and 1118. For example, a customer may access the online store, browse cloud services offered by cloud infrastructure system 1102, and place a subscription order for one or more services offered by cloud infrastructure system 1102 that the customer wishes to subscribe to. The service request may include information identifying the customer and one or more services that the customer desires to subscribe to. For example, a customer may place a subscription order for an authentication-related service offered by cloud infrastructure system 1102. As part of the order, the customer may provide information identifying an application for which the service is to be provided and the one or more credentials for the application.

In certain examples, such as the example depicted in FIG. 11, cloud infrastructure system 1102 may comprise an order management subsystem (OMS) 1120 that is configured to process the new order. As part of this processing, OMS 1120 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1120 may then invoke the order provisioning subsystem (OPS) 1124 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1124 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1102 as part of the provisioning process. Cloud infrastructure system 1102 may generate an application ID and select a storage virtual machine for an application from among storage virtual machines provided by cloud infrastructure system 1102 itself or from storage virtual machines provided by other systems other than cloud infrastructure system 1102.

Cloud infrastructure system 1102 may send a response or notification 1144 to the requesting customer to indicate when the requested service is now ready for use. In some instances, information (e.g., a link) may be sent to the customer that enables the customer to start using and availing the benefits of the requested services. In certain examples, for a customer requesting the authentication-related service, the response may include an application ID generated by cloud infrastructure system 1102 and information identifying an authentication virtual machine selected by cloud infrastructure system 1102 for an application corresponding to the application ID.

Cloud infrastructure system 1102 may provide services to multiple customers. For each customer, cloud infrastructure system 1102 is responsible for managing information related to one or more subscription orders received from the customer, maintaining customer data related to the orders, and providing the requested services to the customer. Cloud infrastructure system 1102 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1102 may provide services to multiple customers in parallel. Cloud infrastructure system 1102 may store information for these customers, including possibly proprietary information. In certain examples, cloud infrastructure system 1102 comprises an identity management subsystem (IMS) 1128 that is configured to manage customer information and provide the separation of the managed information such that information related to one customer is not accessible by another customer. IMS 1128 may be configured to provide various security-related services such as identity services, such as information access management, authentication and authorization services, services for managing customer identities and roles and related capabilities, and the like.

Figure 12:
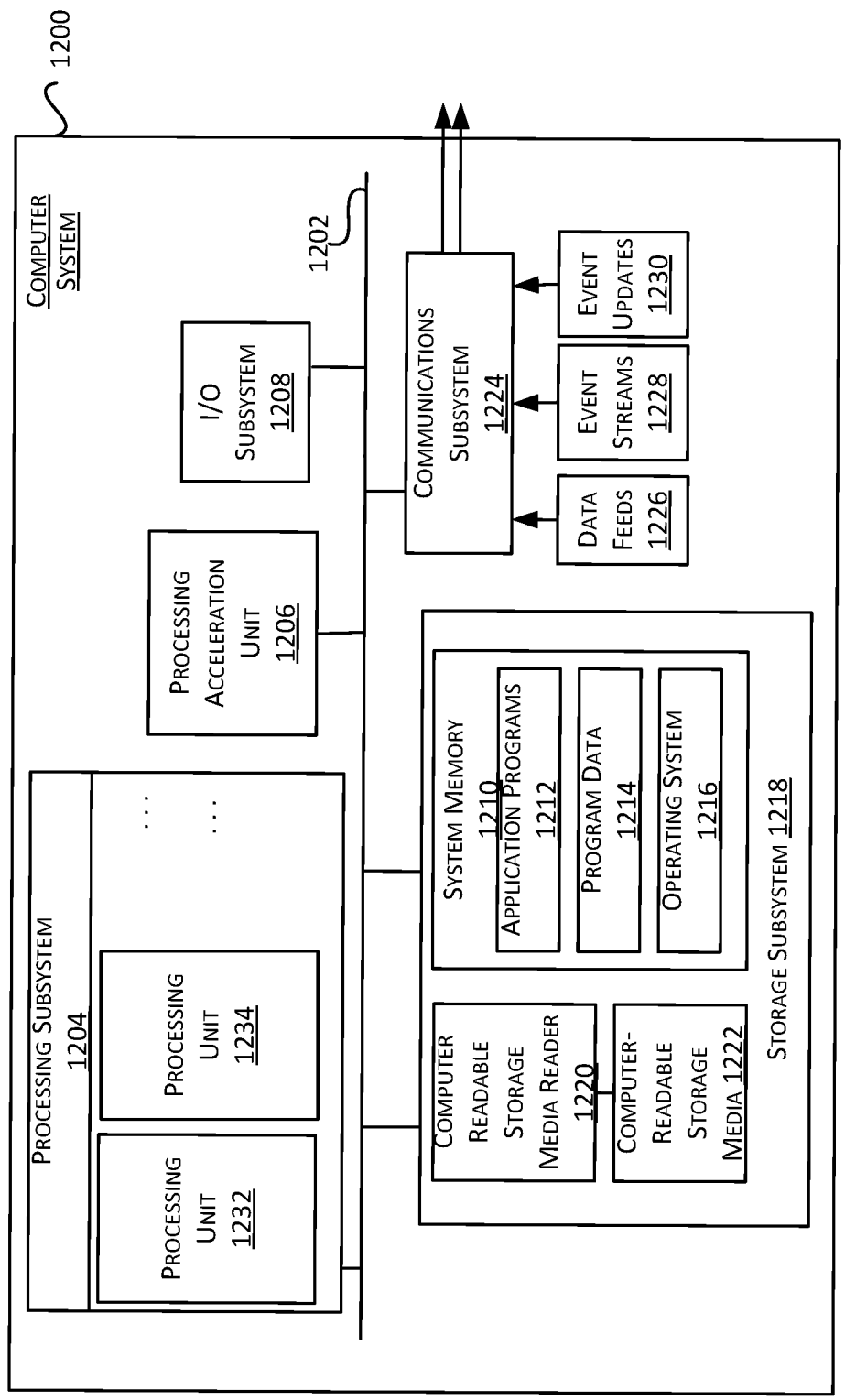
FIG. 12 illustrates an example of a computer system.

FIG. 12 illustrates an example of computer system 1200. In some examples, computer system 1200 may be used to implement any of the application system, access management system, systems within a data center, and various servers and computer systems described above. As shown in FIG. 12, computer system 1200 includes various subsystems including a processing subsystem 1204 that communicates with a number of other subsystems via a bus subsystem 1202. These other subsystems may include a processing acceleration unit 1206, an I/O subsystem 1208, a storage subsystem 1218, and a communications subsystem 1224. Storage subsystem 1218 may include non-transitory computer-readable storage media including storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative examples of the bus subsystem may utilize multiple buses. Bus subsystem 1202 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1204 controls the operation of computer system 1200 and may comprise one or more processors, application specific integrated circuits (ASICs), or field programmable gate arrays (FPGAs). The processors may include be single core or multicore processors. The processing resources of computer system 1200 may be organized into one or more processing units 1232, 1234, etc. A processing unit may include one or more processors, one or more cores from the same or different processors, a combination of cores and processors, or other combinations of cores and processors. In some examples, processing subsystem 1204 may include one or more special purpose co-processors such as graphics processors, digital signal processors (DSPs), or the like. In some examples, some or all of the processing units of processing subsystem 1204 may be implemented using customized circuits, such as application specific integrated circuits (ASICs), or field programmable gate arrays (FPGAs).

In some examples, the processing units in processing subsystem 1204 may execute instructions stored in system memory 1210 or on computer readable storage media 1222. In various examples, the processing units may execute a variety of programs or code instructions and may maintain multiple concurrently executing programs or processes. At any given time, some or all of the program code to be executed may be resident in system memory 1210 and/or on computer-readable storage media 1222 including potentially on one or more storage devices. Through suitable programming, processing subsystem 1204 may provide various functionalities described above. In instances where computer system 1200 is executing one or more virtual machines, one or more processing units may be allocated to each virtual machine.

In certain examples, a processing acceleration unit 1206 may optionally be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1200 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information and data that is used by computer system 1200. Storage subsystem 1218 provides a tangible non-transitory computer-readable storage medium for storing the basic programming and data constructs that provide the functionality of some examples. Storage subsystem 1218 may store software (e.g., programs, code modules, instructions) that when executed by processing subsystem 1204 provides the functionality described above. The software may be executed by one or more processing units of processing subsystem 1204. Storage subsystem 1218 may also provide authentication in accordance with the teachings of this disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM), dynamic random access memory (DRAM), and the like.

By way of example, and not limitation, as depicted in FIG. 12, system memory 1210 may load application programs 1212 that are being executed, which may include various applications such as Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1222 may store programming and data constructs that provide the functionality of some examples. Computer-readable media 1222 may provide storage of computer-readable instructions, data structures, program modules, and other data for computer system 1200. Software (programs, code modules, instructions) that, when executed by processing subsystem 1204 provides the functionality described above, may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1218 may also include a computer-readable storage media reader 1220 that may further be connected to computer-readable storage media 1222. Reader 1220 may receive and be configured to read data from a memory device such as a disk, a flash drive, etc.

In certain examples, computer system 1200 may support virtualization technologies, including but not limited to virtualization of processing and memory resources. For example, computer system 1200 may provide support for executing one or more virtual machines. In certain examples, computer system 1200 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices. For example, when computer system 1200 is used to implement access management system 150 depicted in FIG. 1, the communication subsystem may be used to communicate with an application system and also a system executing a storage virtual machine selected for an application.

Communication subsystem 1224 may support both wired and/or wireless communication protocols. In certain examples, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1224 may provide wired network connectivity (e.g., Ethernet) in addition to or instead of a wireless interface.

Communication subsystem 1224 may receive and transmit data in various forms. In some examples, in addition to other forms, communications subsystem 1224 may receive input communications in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter feeds, Facebook updates, web feeds such as Rich Site Summary (RSS) feeds, and/or real-time updates from one or more third party information sources.

In certain examples, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to communicate data from computer system 1200 to other computer systems or networks. The data may be communicated in various different forms such as structured and/or unstructured data feeds 1226, event streams 1228, event updates 1230, and the like to one or more databases that may be in communication with one or more streaming data source computers coupled to computer system 1200.

Computer system 1200 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A non-transitory computer-readable storage memory storing one or more instructions, which upon execution by one or more processors, cause the one or more processors to perform processing comprising:
    receiving, from a client device, a configuration of a shift rule, the shift rule comprising a time-shift rule or a location-shift rule;
    receiving, from the client device, an access request for a resource;
    accessing the shift rule;
    determining, using the shift rule, a previous location of the client device from a plurality of stored previous locations for the client device, each of the plurality of stored previous locations indicating a location of the client device during a previous access request;
    determining a user-configured question associated with the previous location;
    communicating the user-configured question to the client device;
    receiving a response from the client device to the user-configured question, the response including an answer to the user-configured question; and
    authenticating a user of the client device based upon the answer.

2. The non-transitory computer-readable storage memory of claim 1, wherein the processing further comprises:
    performing a first authentication for the user in response to receiving the access request; and
    wherein accessing the shift rule, determining the previous location of the user, determining the user-configured question, communicating the user-configured question to the user, receiving the response, and authenticating the user based upon the answer is performed only upon determining that the first authentication was successful for the user.

3. The non-transitory computer-readable storage memory of claim 1, wherein the processing further comprises:
    determining a current location of the user based upon the access request;
    receiving, from the user, a new question to be associated with the current location;
    receiving, from the user, a new answer to the new question; and
    storing, for the user, information associating the new answer with the new question and associating the new question with the current location.

4. The non-transitory computer-readable storage memory of claim 3, wherein:
    the access request is received from a user device used by the user; and
    determining the current location of the user based upon the access request comprises determining a geographical location of the user device when the access request was generated.

5. The non-transitory computer-readable storage memory of claim 4, wherein:
    the access request includes global positioning system coordinates of the user device; and
    determining the current location of the user comprises determining the current location based upon the global positioning system coordinates of the user device.

6. The non-transitory computer-readable storage memory of claim 1, wherein determining the previous location includes:
    determining a time shift value from the shift rule, wherein the time shift value indicates a number of stored previous locations from the plurality of stored previous locations to go back; and
    selecting the previous location from the plurality of stored previous locations using the time shift value.

7. The non-transitory computer-readable storage memory of claim 6, wherein the time shift value is user configured.

8. The non-transitory computer-readable storage memory of claim 1, wherein determining the previous location includes:
    determining a time shift value from the shift rule, wherein the time shift value indicates a period of time;
    determining a current time associated with the access request;
    determining a previous time by subtracting the time shift value from the current time; and
    selecting the previous location from the plurality of stored previous locations based upon the previous time.

9. The non-transitory computer-readable storage memory of claim 1, wherein authenticating the user based upon the answer comprises:
    identifying a user-configured answer for the user-configured question;
    comparing the user-configured answer to the answer; and
    enabling the user to access the resource requested in the access request upon determining that the answer included in the response matches the user-configured answer.

10. The non-transitory computer-readable storage memory of claim 1, wherein authenticating the user based upon the answer comprises:

determining one or more possible answers to the user-configured question; and comparing the one or more possible answers to the answer included in the response to determine whether the answer included in the response matches at least one answer from the one or more possible answers; and enabling the user to access the resource requested in the access request upon determining that the answer included in the response matches at least one possible answer from the one or more possible answers.

11. The non-transitory computer-readable storage memory of claim 10, wherein the one or more possible answers are filtered based on one or more user-configured answer rules.

12. The non-transitory computer-readable storage memory of claim 10, wherein:

the access request is associated with an account;

the user-configured question is associated with the account; and the one or more possible answers are not associated with the account.

13. The non-transitory computer-readable storage memory of claim 1, wherein determining a previous location of the user comprises:

determining a location shift from the shift rule, the location shift identifying a distance and a direction;

determining a first location from the plurality of stored previous locations; and determining the previous location by applying the location shift to the first location.

14. The non-transitory computer-readable storage memory of claim 1, wherein the resource is an account, a database, a server, a document, a data object, a device, or an application.

15. A system comprising:

one or more processors; and a memory accessible to the one or more processors, the memory storing one or more instructions that, upon execution by the one or more processors, cause the one or more processors to:

receive a configuration of a shift rule from a client device, the shift rule comprising a time-shift rule or a location-shift rule;

receive an access request for a resource from the client device;

determine a current location of the client device based on the access request;

access the shift rule;

determine, using the shift rule, a previous location of the client device from a plurality of stored previous locations for the client device, each of the plurality of stored previous locations indicating a location of the client device during a previous access request;

determine a user-configured question associated with the previous location; and send the user-configured question to the client device.

16. The system of claim 15, wherein the one or more instructions, upon execution by the one or more processors, further cause the one or more processors to:

perform a first authentication for the client device in response to receiving the access request; and wherein accessing the shift rule, determining the previous location of the client device, determining the user-configured question, and sending the user-configured question to the client device is performed only upon determining that the first authentication was successful for the client device.

17. The system of claim 15, wherein the resource is an account, a database, a server, a document, a data object, a device, or an application.

18. A method comprising:

receiving, from a client device, a configuration of a shift rule, the shift rule comprising a time-shift rule or a location-shift rule;

receiving, by a computer system, an access request for a resource, from the client device;

determining, by the computer system, a current location of the client device based on the access request;

accessing, by the computer system, the shift rule;

determining, by the computer system using the shift rule, a previous location of the client device from a plurality of stored previous locations for the client device, each of the plurality of stored previous locations indicating a location of the client device during a previous access request;

determining, by the computer system, a user-configured question associated with the previous location; and sending, by the computer system, the user-configured question to the client device.

19. The method of claim 18 further comprising:

performing a first authentication for the client device in response to receiving the access request; and wherein accessing the shift rule, determining the previous location of the client device, determining the user-configured question, and sending the user-configured question to the client device is performed only upon determining that the first authentication was successful for the client device.

20. The method of claim 18, wherein the resource is an account, a database, a server, a document, a data object, a device, or an application.

* * * * *

UNITED STATES PATENT AND TRADEMARK OFFICE
CERTIFICATE OF CORRECTION

PATENT NO. : 10,637,871 B2  
APPLICATION NO. : 15/659530  
DATED : April 28, 2020  
INVENTOR(S) : Balakrishnan et al.

Page 1 of 1

It is certified that error appears in the above-identified patent and that said Letters Patent is hereby corrected as shown below:

In the Specification

In Column 2, Lines 52-53, delete "sendinf" and insert -- sending --, therefor.

In Column 13, Line 3, delete "618" and insert -- 618. --, therefor.

In Column 17, Line 58, delete "iPhone)," and insert -- iPhone®), --, therefor.

In Column 18, Line 41, delete "JAVA" and insert -- JAVA® --, therefor.

In Column 27, Line 31, delete "Twitter" and insert -- Twitter® --, therefor.

In Column 27, Line 32, delete "Facebook" and insert -- Facebook® --, therefor.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*